(12) United States Patent
Zang et al.

(10) Patent No.: US 11,966,761 B1
(45) Date of Patent: Apr. 23, 2024

(54) REUSABLE USER INTERFACE IN METADATA DRIVEN APPLICATION

(71) Applicant: SAP SE, Walldorf (DE)

(72) Inventors: Yan Zang, Singapore (SG); Sheng Yao, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/311,436

(22) Filed: May 3, 2023

(51) Int. Cl.
  *G06F 9/451* (2018.01)
  *G06F 3/0482* (2013.01)
  *G06F 3/04847* (2022.01)

(52) U.S. Cl.
  CPC ........... *G06F 9/451* (2018.02); *G06F 3/0482* (2013.01); *G06F 3/04847* (2013.01)

(58) Field of Classification Search
  CPC ..... G06F 9/451; G06F 3/0482; G06F 3/04847
  See application file for complete search history.

(56) References Cited

U.S. PATENT DOCUMENTS

| 10,528,979 B2 * | 1/2020 | Erickson ............ G06Q 30/0269 |
| 2003/0005412 A1 * | 1/2003 | Eanes ...................... G06F 8/36 717/120 |
| 2016/0063191 A1 * | 3/2016 | Vesto ..................... G16H 50/50 705/2 |
| 2020/0057995 A1 * | 2/2020 | Rajwade ............ G06F 9/45504 |
| 2021/0109943 A1 * | 4/2021 | Frantz ................... G06F 16/252 |

* cited by examiner

*Primary Examiner* — Seth A Silverman

(74) *Attorney, Agent, or Firm* — Mintz Levin Cohn Ferris Glovsky and Popeo, P.C.

(57) ABSTRACT

In some embodiments, there is provided a method including creating at least one reusable user interface metadata definition for at least one user interface object; storing the at least one reusable user interface metadata definition; creating at least a portion of a user interface page, which includes the at least one user interface object, using the at least one reusable user interface metadata definition; overriding the at least one reusable user interface metadata definition; bundling into a container the least one reusable user interface metadata definition with other metadata definitions; and deploying the container of the at least one reusable user interface metadata definition and the other metadata definitions to a device where a metadata interpreter can generate at least one user interface object associated with the at least one reusable metadata definition. Related systems and computer program products are also provided.

20 Claims, 10 Drawing Sheets

Creating at least one reusable UI metadata definition for at least one user interface object 302

Storing the at least one reusable UI metadata definition 304

Creating at least a portion of a user interface page, which includes the at least one user interface object, using the at least one reusable UI metadata definition 306

Overriding at least one reusable UI metadata definition 308

Bundling into a container the at least one reusable UI metadata definition with other metadata definitions 310

Deploying the container at least one reusable UI metadata definition to a device where a metadata interpreter at the device generates the at least one user interface object associated with the at least one reusable UI metadata definition 312

FIG. 3

REUSABLE USER INTERFACE IN METADATA DRIVEN APPLICATION

TECHNICAL FIELD

The subject matter described herein relates generally to user interface (UI) development.

BACKGROUND

With the rapid progress of digitalization of the enterprise, more and more applications are being developed and deployed to the cloud (e.g., one or more servers coupled to the Internet). However, the deployment of these application is limited by the limited supply of professional user interface and application developers. As such, there is a need for low-code and no-code development environments to empower users such that the user can develop applications with little if any code writing.

SUMMARY

In some embodiments, there is provided a method including creating at least one reusable user interface metadata definition for at least one user interface object; storing the at least one reusable user interface metadata definition; creating at least a portion of a user interface page, which includes the at least one user interface object, using the at least one reusable user interface metadata definition; overriding the at least one reusable user interface metadata definition; bundling into a container the least one reusable user interface metadata definition with other metadata definitions; and deploying the container of the at least one reusable user interface metadata definition and the other metadata definitions to a device where a metadata interpreter can generate at least one user interface object associated with the at least one reusable metadata definition.

In some variations, one or more features disclosed herein including the following features can optionally be included in any feasible combination. The at least one reusable user interface metadata definition may define one or more properties associated with the at least one user interface object. The at least one reusable user interface metadata definition may be flagged with a fragment extension to indicate that the at least one reusable user interface metadata definition can be overridden. The at least one user interface object may include a user interface element, a search bar user interface element, a drop down user interface element, a user interface selection element, a toolbar user interface element, and/or an action bar user interface element. The creating at least the portion of the user interface page may further include accessing a visual user interface editor to select the at least one user interface object and viewing, via the visual user interface editor, the at least one reusable user interface metadata definition. The overriding the at least one reusable user interface metadata definition may further include editing, via the visual user interface editor, at least one property of the at least one reusable user interface metadata definition. The overriding the at least one reusable user interface metadata definition may further include adding at least one property of the at least one reusable user interface metadata definition. The overriding the at least one reusable user interface metadata definition may further include deleting at least one property of the at least one reusable user interface metadata definition. An integrated development environment may be used to bundle into the container the least one reusable user interface metadata definition with other metadata definitions. The deploying the container may further include sending the container to the device.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the allocation of worker threads to resume execution of a query execution plan, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 depicts an example of a process for creating and consuming the reusable UI metadata definitions, in accordance with some example embodiments;

DETAILED DESCRIPTION

Figure 1:
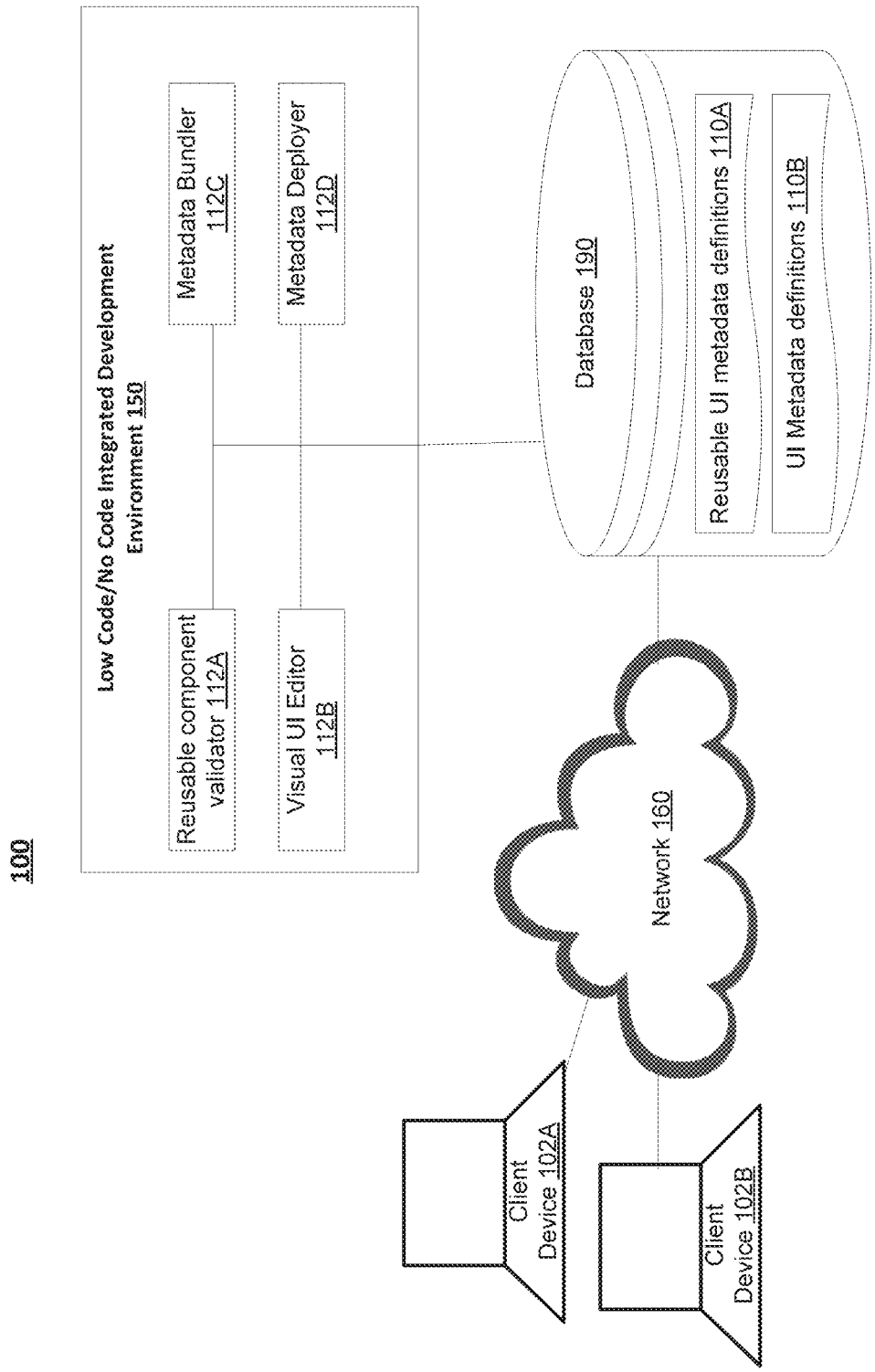
FIG. 1 depicts an example of a system for creating and/or consuming reusable user interface (UI) metadata definitions, in accordance with some embodiments.

As noted, there is a need for low-code and no-code development environments such that applications can be developed with little if any code writing. For example, an application may use or include a user interface (UI) to enable user interaction with the application. And, the application may use the same (or similar UI with slight differences) in multiple places in the application, but it is not efficient to simply duplicate the UI multiple times in the application. Accordingly, therefore, there is a need or requirement to be able to create and consume reusable UI metadata definition(s) in a metadata driven application to enable user development of UIs in a no-code or low code development environment.

In some embodiments, there is provided reusable UI metadata definitions. For example, the reusable UI metadata definitions may be created and consumed (e.g., used) in a metadata driven application that is developed in no code or low code integrated development environment. The phrases "no code" and "low code" development environments are used herein interchangeably to refer to integrated development environments in which little if any coding (e.g., HTML, SQL, etc.) is needed by the user to develop an application or its user interface.

The reusable UI metadata definition may, for example, be for at least one control, such as a single control or an array of controls. In the case of a single control's reusable UI metadata definition, the reusable UI metadata definition may contain only a single control UI object (which is also referred to as a UI element), such as a toolbar item 212B, a search bar item, a drop down element, a selection element, an action bar item 212A, and/or other type of UI element (or object). And, the single control UI object may be represented by a metadata definition, such as the reusable UI metadata definition (which may be contained within opening and closing braces, such as "{" and "}"). In other words, the single control may correspond to a single UI element (or object), such as a search bar, a drop down element, a selection element, and/or the like. On the other hand, the array reusable UI metadata definition may contains an array of (e.g., plurality of) controls that are represented by a reusable UI metadata definition that includes an array for the UI objects (e.g., wherein the array UI elements are contained within brackets, such as "[" and "]").

In some embodiments, the reusable UI metadata definition may be overridden, when it is consumed. When consumed for example, the properties of the reusable UI metadata definition may be overridden by one or more of the following: a modification of at least one property, an addition of at least one property (e.g., so long as the control inside the reusable UI metadata definition supports it), and a deletion of at least one property (e.g., undefined a property as if the property was never defined). Table 1 below depicts an example of a single control's reusable UI metadata definition.

Referring to Table 1, the reusable UI metadata definition may include properties for the UI object. In other words, the metadata definition may define one or more properties of the UI object (e.g., UI element). Examples of these properties may include the UI object's appearance, associated text for the UI object, one or more actions performed by the UI object, and/or the UI object's type such as input controls (e.g., checkboxes, radio buttons, dropdown lists, list boxes, buttons, toggles, text fields, and/or date field), navigational components (e.g., a slider, a search field, tags, and/or icons), and information components (e.g., tool tips, progress bars, notifications, message boxes, and/or popup windows), and/or the like. In other words, the properties define (using the reusable UI metadata definition) the UI object, such that it can be presented on a page by an interpreter at, for example, a user device, such as a mobile phone, laptop, tablet, and/or the like.

In the example of Table 1, the reusable UI metadata definition defines one or more properties of the UI object. For example, the "Type" defines that the UI object is a cell control type UI object, the "DetailImageText" defines where to obtain an image associated with the UI object (e.g., ObjectCell), "AccessoryType" defines an optional accessory icon to be displayed in the cell, "Title" defines text associated with or placed near the UI object (e.g., a title such as Product Name), Subhead defines text such as a "Company Name" to be associated with or placed near the UI object, "StatusImage" defines a status image displayed in the status view, "Footnote" defines text of footnote of the cell, "StatusText" which defines a status label displayed in the status view, "SubstatusText" defines a substatus label displayed below status view, "PreserveIconStackSpacing" defines a setting that when set to true, spacing is preserved for icon stacking even when there are no icons/images added to the icon stack, and the "OnPress" property defines a file at which the action for the UI object is defines upon selection (e.g., press of the UI object).

In some embodiments, a reusable UI metadata definition may, as noted, be overridden when it is consumed. For example, a reusable component validator 112A may fetch the UI metadata from the database 190 and may override one or more of the defined properties by as noted modifying existing properties, adding properties, deleting an existing property, and/or the like.

TABLE 1

ProductObjectCell.fragment
{
   "_Type": "Control.Type.ObjectCell",
   "DetailImageText": "/MyRules/GetDetailImageText.js",
   "AccessoryType": "disclosureIndicator",
   "Title": "{ProductName}",
   "Subhead": "{Supplier/CompanyName}",
   "StatusImage": "/Images/DetailImage.png",
   "Footnote": "{Category/CategoryName}",
   "StatusText": "{UnitPrice}",
   "SubstatusText": "{UnitsInStock}",
   "PreserveIconStackSpacing": false,
   "OnPress": "/MyApp/Actions/NavToProductDetail.action"
}

In some embodiments, the reusable UI metadata definition is flagged as a reusable UI metadata definition using a term or extension, such as ".fragment." The term "fragment" refers to a reusable class implementing a portion of an activity (e.g., a portion of a user interface) and defined using specific metadata definition language.

Before providing additional examples regarding the reusable UI metadata definitions, the following provides an example of a system and a process for creating and/or consuming reusable UI metadata definitions.

FIG. 1 depicts an example of a system 100 for creating and/or consuming reusable UI metadata definitions, in accordance with some embodiments. The system 100 may include one or more of the following: one or more client devices 102A-102B, a network 160 (e.g., the Internet and/or any other type of communications), a low code/node code integrated development environment 150, and a database 190. Although FIG. 1 depicts a certain quantity of client devices, network, low code/node code integrated development environment, and database, other quantities and configurations of these components depicted in the example of FIG. 1 may be implemented as well.

At FIG. 1, the one or more client devices 102A-B may be accessed by one or more users to create applications including user interfaces developed using metadata definitions, such as the reusable UI metadata definitions, in accordance with some embodiments. The one or more client devices 102A-B may also be accessed by one or more users to view and/or access the applications including user interfaces that is created.

The low code/node code integrated development environment 150 (also referred to herein as the integrated development environment or low code/node code integrated development system) may further include a reusable component validator 112A for retrieving the reusable UI metadata definitions 110A (as well as other UI related metadata definitions 110B) from the database 190 and overriding (if needed) the reusable UI metadata definitions.

The low code/node code integrated development environment 150 may further include a visual UI editor 112B that provides at least a user interface where a user may select UI objects and place them (e.g., via a drag and drop) on a panel or palette to generate, at design time, a UI, such that the selected UI object is mapped to (e.g., associated with or linked to) a corresponding reusable UI metadata definition. The visual UI editor's user interface may also include a panel where the properties of the reusable UI metadata definition can be viewed, created, and/or modified without the user having to use coding.

The low code/node code integrated development environment 150 may further include a metadata bundler 112C. The metadata bundler bundles into a package the metadata definitions (including reusable metadata data definitions) for a given UI (or application) under development at the integrated development environment 150. During the bundling, the metadata bundler may replace file references of the reusable metadata data definitions with the actual content referenced by the file reference, perform overriding of the properties of the reusable metadata data definitions, and provide the bundled package to a metadata deployer 112D.

The low code/node code integrated development environment 150 may further include the metadata deployer 112D to deploy metadata to a user device such as client devices 102A-B, where a metadata definition interpreter application running at the client device can interpret the metadata definitions (including reusable metadata data definitions) for a given UI (or application) and provide (e.g., present on a display) the corresponding UI object(s) defined by the metadata on a page of the UI.

Figure 2A:
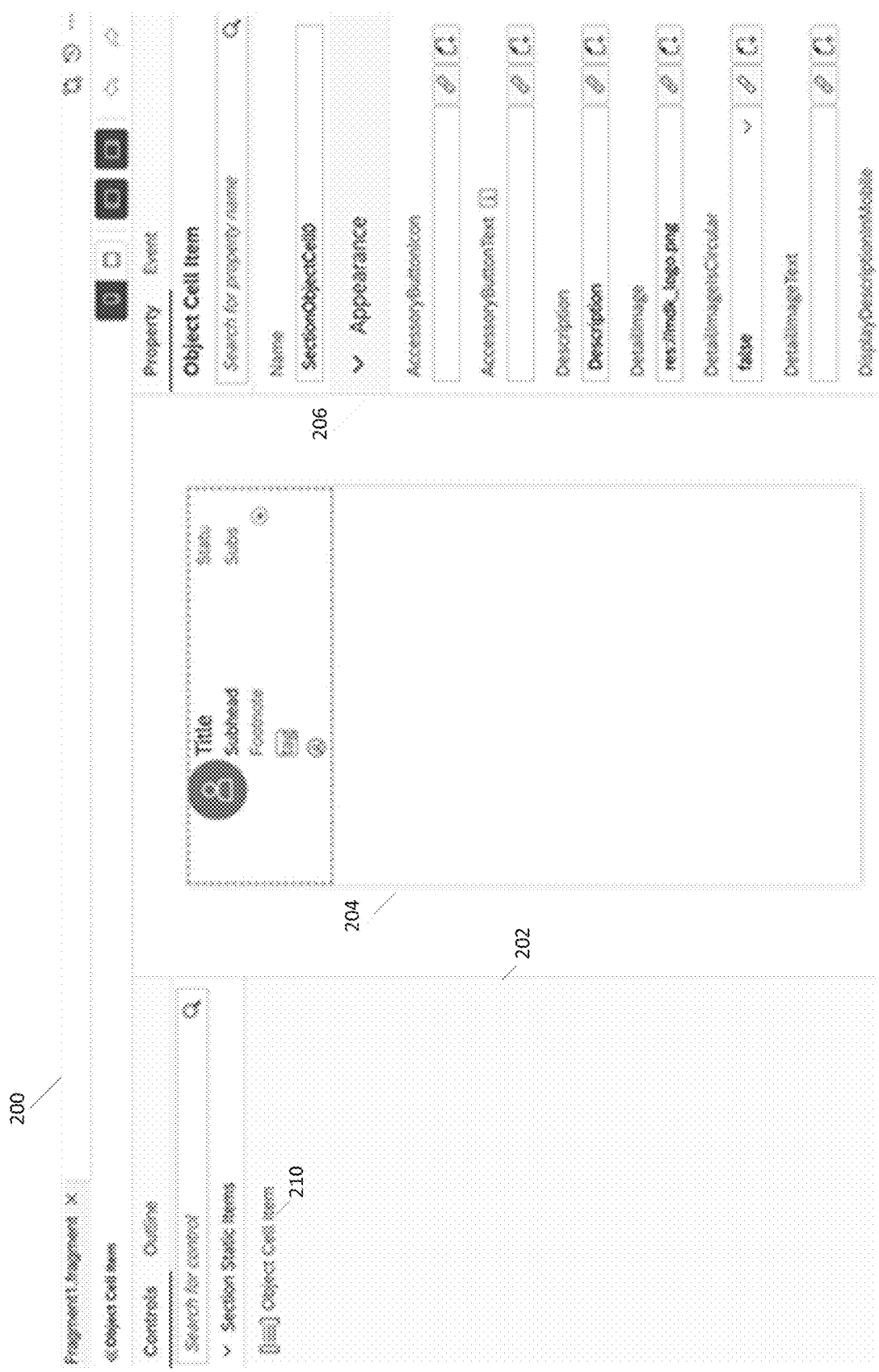
FIGS. 2A-2B depict an example of a user interface provided by an integrated development environment during the design time of a user interface being developed using reusable UI metadata definitions, in accordance with some example embodiments.
Figure 2B:
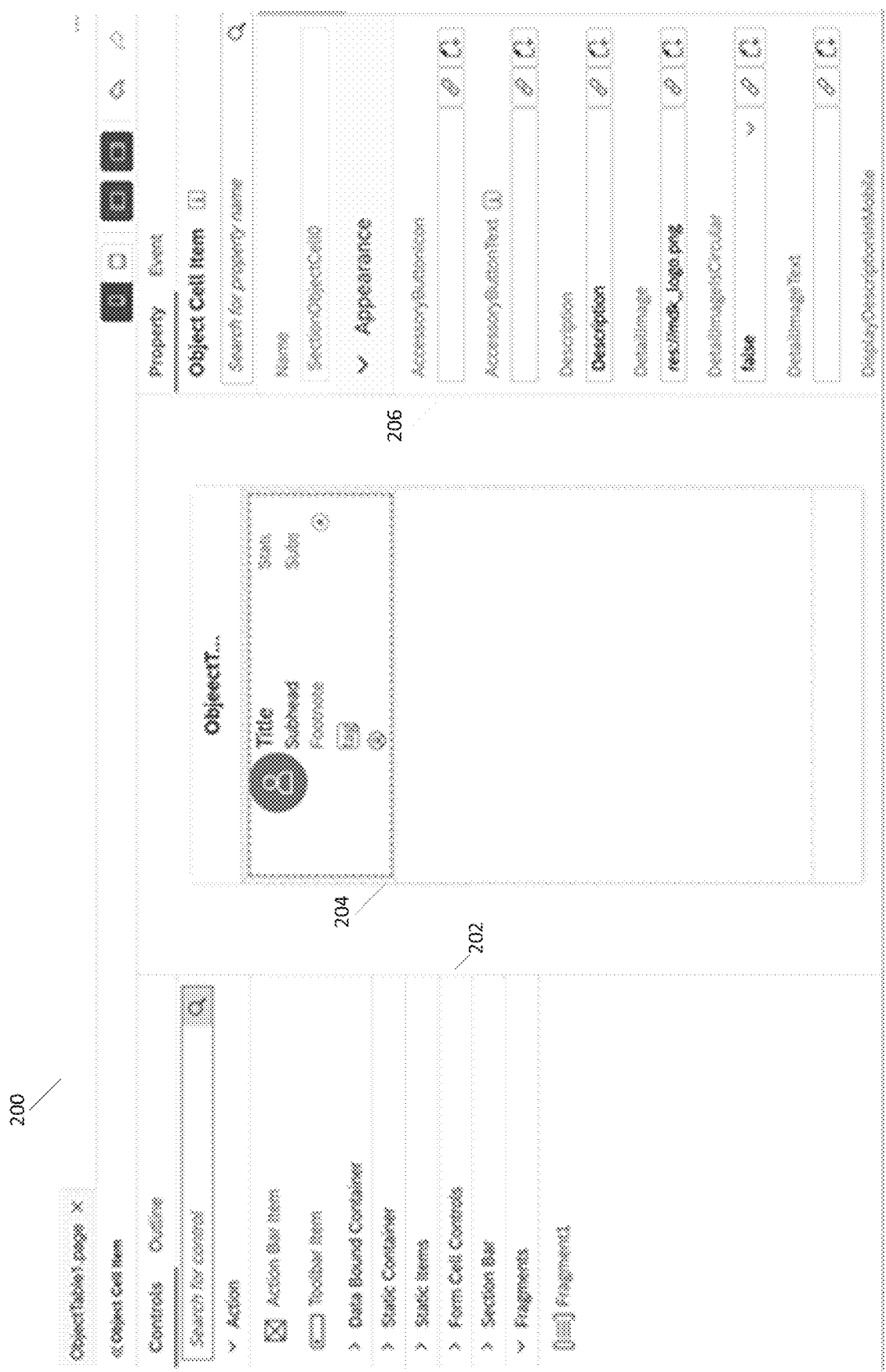

FIGS. 2A-2B depict an example of a user interface 200 provided by the integrated development environment 150 during the design time of a user interface being developed using the reusable UI metadata definitions. For example, the visual UI editor 112B may provide (via user interface 200 or palette) editing and creating of the user interface being developed using metadata definitions including the reusable UI metadata definitions.

In the example of FIGS. 2A-2B, a first panel 202 may be used to search for user interface objects for the user interface being developed using the reusable UI metadata definitions. For example, a user interface object, such as user interface object 210, may be selected from a plurality of user interface objects and dragged and dropped into a second panel (or palette) 204 that provides a visual representation of the user interface being developed using the reusable UI metadata definitions. The user interface objects may include for example checkboxes, radio buttons, dropdown lists, a search field or bar, and/or other types of UI elements or objects. When for example an user interface object 210 (e.g., object cell item) is dragged into the panel 204, the reusable metadata definition mapped to the object cell item is retrieved from the database 190 and presented at the user interface 200 (e.g., at panel 206). In the example of FIG. 2A-2B, the panel 206 is an example showing only a portion of the properties defined using the reusable UI metadata definitions. For example, in the case of the UI object being the ObjectCell of Table 1, each of the properties would be accessible, viewable, and editable via the panel 206 of the visual editor.

The visual UI editor 112B may also include a panel 206 for defining properties and events of the metadata definitions and reusable metadata definitions. If the reusable metadata definition has been previously defined and as such retrieved from the database 190, the panel 208 may be used to further define and/or override the UI object. FIG. 2B shows at the first panel 202 additional user interface objects (e.g., action bar item, tool bar item, etc.), each of which can be selected, and dragged to the second panel 204. Moreover, the metadata definitions of the fragments may also be viewed and/or defined via for example the third panel 206. To illustrate further, when creating at least the portion of the user interface page at 204 using the visual user interface editor, a user interface object 210, such as object cell item, may be selected, which caused at least a portion of the corresponding reusable user interface metadata definition to be viewed at panel 206. Alternatively, or additionally, the corresponding metadata definition may be viewed by searching (as shown at 466 at FIG. 4C) and then viewing the corresponding reusable UI metadata definition (as shown at 415 at FIG. 4D). When the reusable user interface metadata definition is being overridden to change a property, the panel 206 of the visual user interface editor may be used to edit one or more properties of the reusable user interface metadata definition. In the example of FIG. 2B for example, the property of DetailImage can be edited to revise the property.

FIG. 3 depicts an example process for using reusable UI metadata definitions, in accordance with some embodiments.

At 302, at least one reusable UI metadata definition may be created for at least one user interface object, in accordance with some embodiments. For example, the integrated development system 150 and, in particular, the visual UI editor 112B, may be used to create a reusable UI metadata definition for a corresponding UI object. Referring to the example of FIG. 2A, a user interface object 210 (e.g., an object item) for a UI may be created and defined using panel 202 and panel 206 of the visual UI editor. This may include defining metadata definitions, such as reusable UI metadata definitions, an example of which is depicted at Table 1 above. The reusable UI metadata thus define properties of the UI object, such that the UI object can be presented on a page by an interpreter at a user device. The reusable metadata definition is reusable in the sense that after it is created at design time, the reusable metadata definition can be overridden (as noted below at 308) to create UI elements (also referred to as UI objects) when creating a UI page, for example. By contrast, a metadata definition that is not reusable is static and, as such, cannot be overridden at 308. As used herein, the user interface object refers to a objects which can be implemented (or presented) on a UI page and viewed on, for example, a browser. Examples of the user interface object (also referred to as a user interface element) include buttons, scrollbars, menu items, checkboxes, object cell item, action bar item, toolbar item, and/or the like. In some instances, the reusable UI metadata definition may be created at design time by defining all of the properties of the UI object. For example, the properties of the ObjectCell UI object of Table 1 may be defined at design time using the visual UI editor (e.g., via the panel 206 where properties can be defined). Alternatively, or additionally, the visual UI editor may provide templates of reusable UI metadata definition, which can be used to create (e.g., using the visual UI editor additional reusable UI metadata definition.

At 304, the at least one reusable UI metadata definition may be stored, in accordance with some embodiments. For example, the integrated development environment 150 and, in particular, the visual UI editor 112B (and/or the reusable component validator 112A) may be used to store a reusable UI metadata definition 110A to the database 190. The stored reusable UI metadata definition 110A may be mapped to its corresponding UI object. The mapping enables the reusable UI metadata definition 110A to be retrieved from the database when the corresponding UI object is selected at the visual UI editor 112B.

At 306, at least a portion of a user interface page, which includes the at least one user interface object, is created using the at least one reusable UI metadata definition, in accordance with some embodiments. For example, the integrated development system 150 and, in particular, the visual UI editor 112B may be used to create a UI page as shown at panel 204 using the reusable UI metadata definition. To illustrate further, the UI page may include at least one UI object 210 (e.g., an object cell item, action bar item 212A, toolbar item 212B, and/or the like), where the UI object is mapped to a corresponding reusable metadata definition 110A at database 190. To illustrate further, when an UI object is flagged (e.g., as a "fragment" as in the example of Table 1), the integrated development environment 150 detects this condition and retrieves the corresponding reusable metadata definition 110A from the database 190 and presents it at panel 206. Moreover, the integrated development environment may also allow certain properties (which can be viewed and/or defined via panel 206) to be overridden as noted above. If a UI object is not reusable and cannot be overridden (e.g., the UI object does not include the .fragment extension so the UI object is static), the UI metadata definition 110B is retrieved but the UI metadata definition is cannot be overridden at panel 206.

At 308, the at least one reusable UI metadata definition may be overridden, in accordance with some embodiments. For example, the integrated development environment 150 and, in particular, the reusable component validator 112A may override one or more properties of the at least one reusable metadata definition. This may be done via panel 206 for example. To illustrate further, the reusable UI metadata definition may be overridden by a modification of at least one property, an addition of at least one property, and/or a deletion of at least one property. For example, a user may via the visual UI editor override a property of the at least one reusable UI metadata definition.

At 310, the at least one reusable UI metadata definition may be bundled into a container with other metadata definitions for UI objects, in accordance with some embodiments. For example, the integrated development environment 150 and, in particular, the metadata bundler 112C may bundle into a container (e.g., a package) the at least one reusable UI metadata definition and other metadata definitions. In other words, bundling the reusable UI metadata definition refers to collecting the reusable UI metadata definition as well as other metadata into a container. The other metadata definitions refers to metadata for other UI objects, such as the noted static UI objects defined by UI metadata definitions 110B that are not reusable so the static UI objects cannot be overridden) and/or other information which can be used to generate the page and the UI objects.

At 312, the container of the at least one reusable UI metadata definition and/or other metadata definitions may be deployed to a device where a metadata interpreter generates at least one UI object associated with the at least one reusable metadata definition, in accordance with some embodiments. For example, the integrated development environment 150 and, in particular, the metadata deployer 112D may deploy the bundle to a user device, such as client 102B. At client 102B, a metadata interpreter may generate a page for a user interface, such that the page includes at least one UI object formed using the at least one reusable metadata definition.

The following provides additional examples of the reusable UI metadata definitions.

The reusable UI metadata definition may be embedded in another the UI metadata definition (which may or may not be a reusable UI metadata definition). Table 2 shows an example of referencing another reusable UI metadata file inside a UI metadata definition. For example, the UI metadata definition of Table 1 defines "ProductObjectCell.fragment." At Table 2, another UI metadata file consumes the "ProductObjectCell.fragment" reusable metadata definition of Table 1 using for example the ObjectCell being "/MyApp/Fragments/ProductObjectCell.fragment". The ObjectCell refers to a list item view UI object/element.

TABLE 2

```
{
  "_Type": "Section.Type.ObjectTable",
  "_Name": "ProductTable",
  "ObjectCell": "/MyApp/Fragments/ProductObjectCell.fragment",
  "Target": {
    "EntitySet": "Products",
    "Service": "/MyApp/Services/SomeOData.service"
  }
}
```

Table 3 shows an example of a complex reusable UI metadata definition. In the example of Table 3, a property "Search" is added to define if search is to be enabled in the ObjectTable and a property "Target" is added to define the service to be used to access the target, so that the object table knows how to dynamically retrieve and populate the OData collection.

TABLE 3

```
ProductSection.fragment
{
  "_Type": "Section.Type.ObjectTable",
  "_Name": "WorkOrderTable",
  "ObjectCell": {
    "_Type": "Control.Type.ObjectCell",
    "Title": "{WorkOrderTitle}"
  }
  "Search": {
    "Enabled": true,
    "Placeholder": "Item Search",
    "BarcodeScanner": true,
    "Delay": 500,
    "MinimumCharacterThreshold": 3
  },
```

TABLE 3-continued

```
    "Target": {
        "EntitySet": "WorkOrderHeaders",
        "Service": "/MyApp/Services/SomeOData.service"
    }
}
```

The example of Table 4 shows a complex reusable UI metadata definition ("/MyApp/Fragments/ProductSection.fragment") as noted above at Table 3, which is embedded in another container control metadata definition.

TABLE 4

```
{
    "OnRendered": "/NorthwindApp/Rules/OnRendered.js",
    "Sections": [
        "/MyApp/Fragments/ProductSection.fragment",
        {
            ... // You can mix with other non-fragmented sections too
        }
    ],
    "_Type": "Control.Type.SectionedTable",
    "_Name": "SectionedTable"
}
```

Table 5 depicts an example of an array reusable UI metadata definition for ActionBarItems (e.g., a plurality of action bar UI elements/objects). The example of Table 5 shows two action bar items defined by the reusable UI metadata definition. The first action bar item (Control.Type.ActionBarItem) defines properties, such as "OnPress": "/MyApp/Actions/NavToUserProfile.action" (which defines the NavToUserProfile.action to be triggered when the item is pressed), "Position": "Right" (which defines the position of the item in the ActionBar is right), "Icon": "sap-icon://account" (which defines an icon of the item in the ActionBar is "sap-icon://account", and "Text": "Profile" (which defines text of the item in the ActionBar is "Profile"). The second action bar item (Control.Type.ActionBarItem) defines properties, such as "OnPress": "/MyApp/Rules/Sync.js" (which defines the Sync.js rule is to be triggered when the item is pressed), Position": "Right" (which defines position of the item in the ActionBar is right), "SystemItem": "Refresh" (which defines SystemItem of the item in the ActionBar is "Refresh"), and "Text": "Refresh" (which defines text of the item in the ActionBar is "Refresh"). Although Table 5 shows an array of two UI objects/elements defined by the reusable UI metadata definition, other quantities of UI objects may be defined as well.

TABLE 5

```
ActionBarItems.fragment
[
    {
        "_Type": "Control.Type.ActionBarItem",
        "OnPress": "/MyApp/Actions/NavToUserProfile.action",
        "Position": "Right",
        "Icon": "sap-icon://account",
        "Text": "Profile"
    },
    {
        "_Type": "Control.Type.ActionBarItem",
        "OnPress": "/MyApp/Rules/Sync.js",
        "Position": "Right",
        "SystemItem": "Refresh",
        "Text": "Refresh"
    }
]
```

Table 6 shows an example of consuming the array reusable UI metadata file in a UI page metadata definition. The page metadata definition may include the array reusable UI metadata file, which defines an ActionBar based on the ActionBarItems.fragment of Table 5. This metadata definition defines a page UI metadata that consumes an array reusable UI metadata file, type property defines the type of this metadata definition is a page, name property defines the name of this metadata definition is "Products List".

TABLE 6

```
{
    "Caption": "My Page",
    "ActionBar": {
        "Items": "/MyApp/Fragments/ActionBarItems.fragment"
    },
    "_Type": "Page",
    "_Name": "Products_List"
}
```

In some instances, the reusable metadata definition may be mixed with other metadata definitions which may not be reusable. This mixed example is depicted at Table 7 where the metadata definition (which is not reusable) comprises:

```
{
    "_Type": "Control.Type.ActionBarItem"
    "OnPress":    "/MyApp/Actions/ClosePageAsCancelled.page",
    "Position": "Left",
    "Text": "Close"
},
``` while the reusable metadata definitions comprise:

"/MyApp/Fragments/ProfileActionBarItem.fragment",

"/MyApp/Fragments/SyncActionBarItem.fragment", wherein the system 100 recognizes the reusable metadata definition by the extension ".fragment".

TABLE 7

```
ProfileActionBarItem.fragment
{
    "_Type": "Control.Type.ActionBarItem"
    "OnPress": "/MyApp/Actions/NavToUserProfile.action",
    "Position": "Right",
    "Icon": "sap-icon://account",
    "Text": "Profile"
}
SyncActionBarItem.fragment
{
    "_Type": "Control.Type. ActionBarItem"
    "OnPress": "/MyApp/Rules/Sync.js",
    "Position": "Right",
    "SystemItem": "Refresh",
    "Text": "Sync"
}
{
    "Caption": "My Page",
    "ActionBar": {
        "Items": [
            {
                "_Type": "Control.Type.ActionBarItem"
                "OnPress": "/MyApp/Actions/ClosePageAsCancelled.page",
                "Position": "Left",
                "Text": "Close"
            },
            "/MyApp/Fragments/ProfileActionBarItem.fragment",
            "/MyApp/Fragments/SyncActionBarItem.fragment",
        ]
    },
```

TABLE 7-continued

```
"_Type": "Page",
"_Name": "Products_List"
}
```

Table 8 depicts an example of the system 100 overriding (e.g., modifying existing properties, adding new properties, or deleting existing properties) of a reusable UI metadata definition, when the reusable UI metadata definition is consumed (which in this example the reusable UI metadata definition is consumed by another metadata definition). In the example of Table 8, the system 100 including component validator 112 may retrieve the reusable UI metadata definition for WorkOrdersSection.fragment, and then override the reusable UI metadata definition by modifying an existing property (e.g., changing "Caption" to "High Priority Work Orders"), deleting a property (e.g., deleting "Search: null"), and replacing the fragment itself with another fragment (e.g., "ObjectCell" "/MyApp/Fragments/HighPrioWorkOrderObjectCell.fragment"), and/or adding a new property (e.g., "Target": {"QueryOptions": $filter=Priority eq 'High'").

TABLE 8

```
{
  "Sections": [
    {
      "_Type": "Fragment",
      "Fragment": "/MyApp/Fragments/WorkOrdersSection.fragment",
      "Properties": {
        "Header": : {
          "Caption": "High Priority Work Orders" // <--- Modifying existing properties in the Fragment
        },
        Search: null, // <--- Deleting properties that exist in the Fragment
        "ObjectCell": "/MyApp/Fragments/HighPrioWorkOrderObjectCell.fragment", //
<--- Replace it with another fragment
        "Target": {
          "QueryOptions": "$filter=Priority eq 'High'" // <--- Adding new properties that
doesn't exist in the Fragment
        }
      }
    },
    "/MyApp/Fragments/WorkOrdersSection.fragment"
  ],
  "_Type": "Control.Type.SectionedTable",
  "_Name": "SectionedTable"
}
```

Table 9 depicts an example of overriding (e.g., modifying) existing properties of an array reusable UI metadata definition that is consumed in another metadata definition. To locate the UI object and the corresponding property being modified, an index number (e.g., #Index) or a name (e.g., #Name) may be used. For example, #Index:0 identifies a specific UI object defined by the reusable UI metadata definition. Likewise, #Name:RefreshItem" identifies a specific UI object defined by the reusable UI metadata definition. Once identified, the property can be changed (e.g., "Text": "User Profile" for #Index:0 and "Text": "Sync" for #Name:RefreshItem).

TABLE 9

```
{
  "Caption": "My Page",
  "ActionBar": {
    "Items": {
      "_Type": "Fragment",
      "Fragment": "/MyApp/Fragments/ActionBarItems.fragment"
```

TABLE 9-continued

```
      "Properties": {
        "#Index:0": {
          "Text": "User Profile"
        }
        "#Name:RefreshItem": {
          "Text": "Sync"
        }
      }
    }
  },
  "_Type": "Page",
  "_Name": "Products_List"
}
```

Figure 4A:
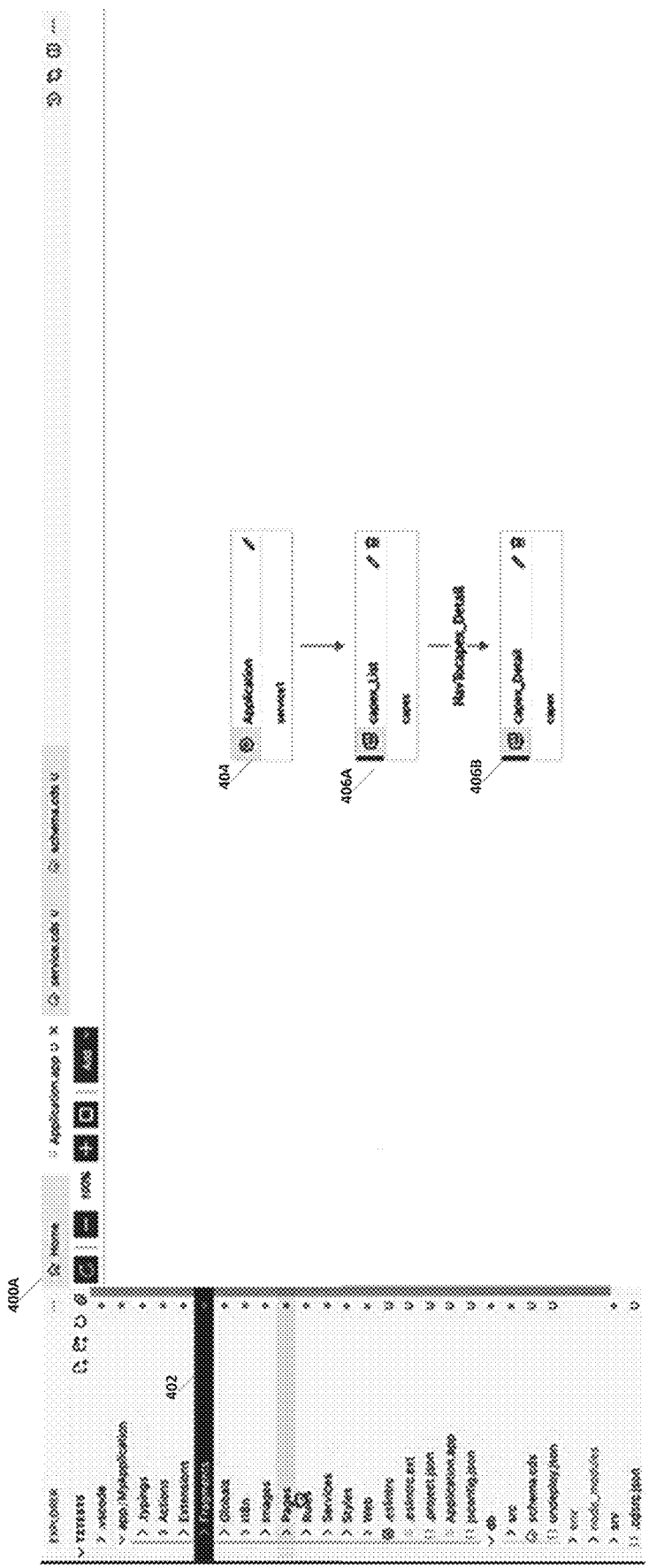
FIGS. 4A, 4B, 4C, 4D, and 4E depict examples of user interfaces provided by an integrated development environment during design time, in accordance with some example embodiments.
Figure 4B:
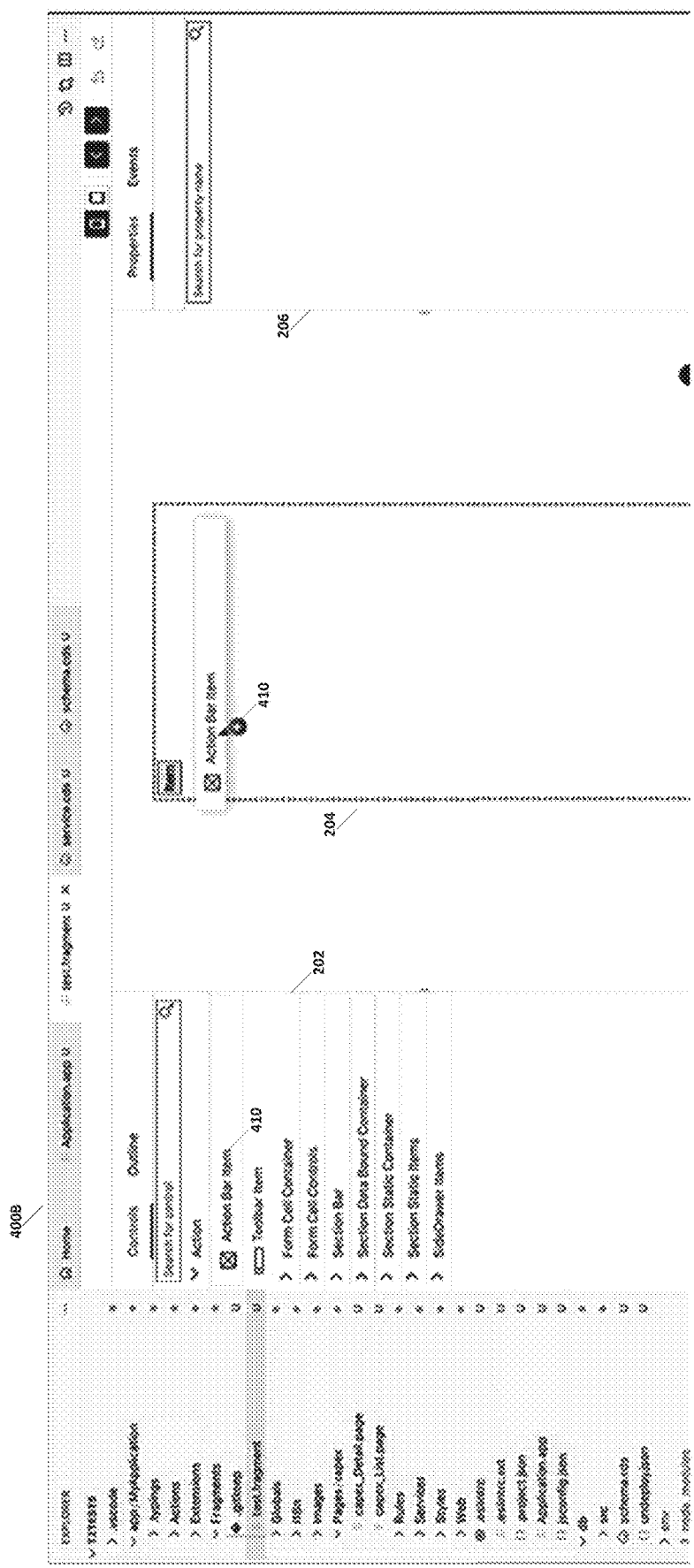
Figure 4C:
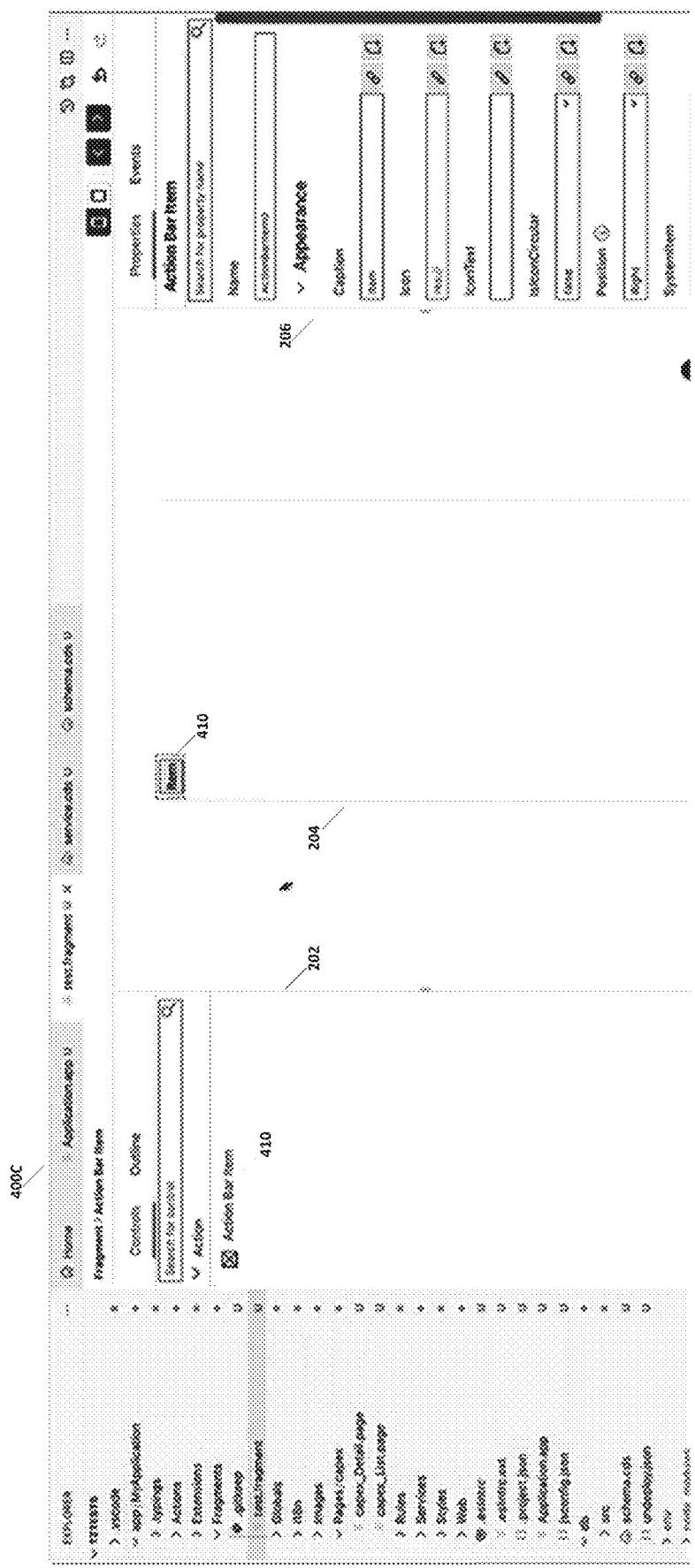
Figure 4D:
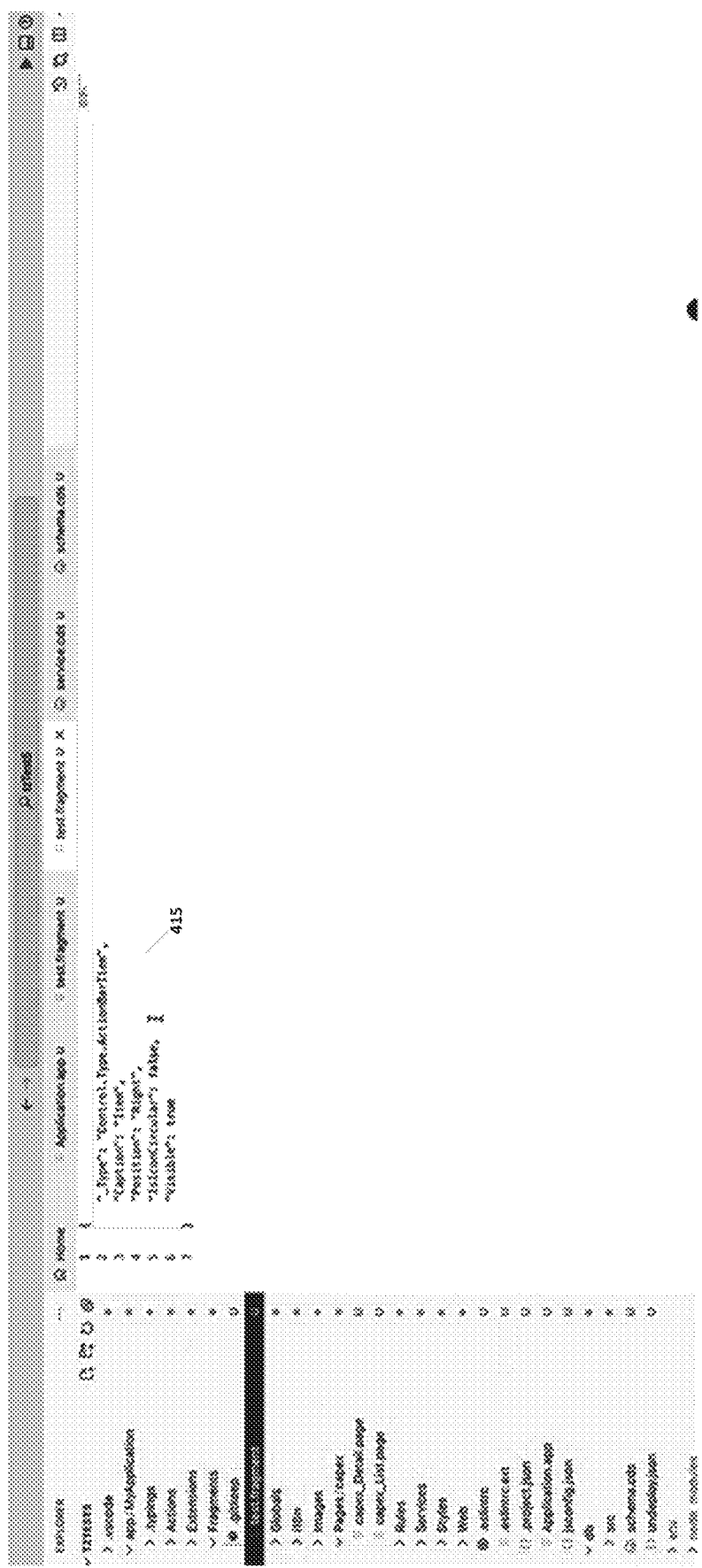
Figure 4E:
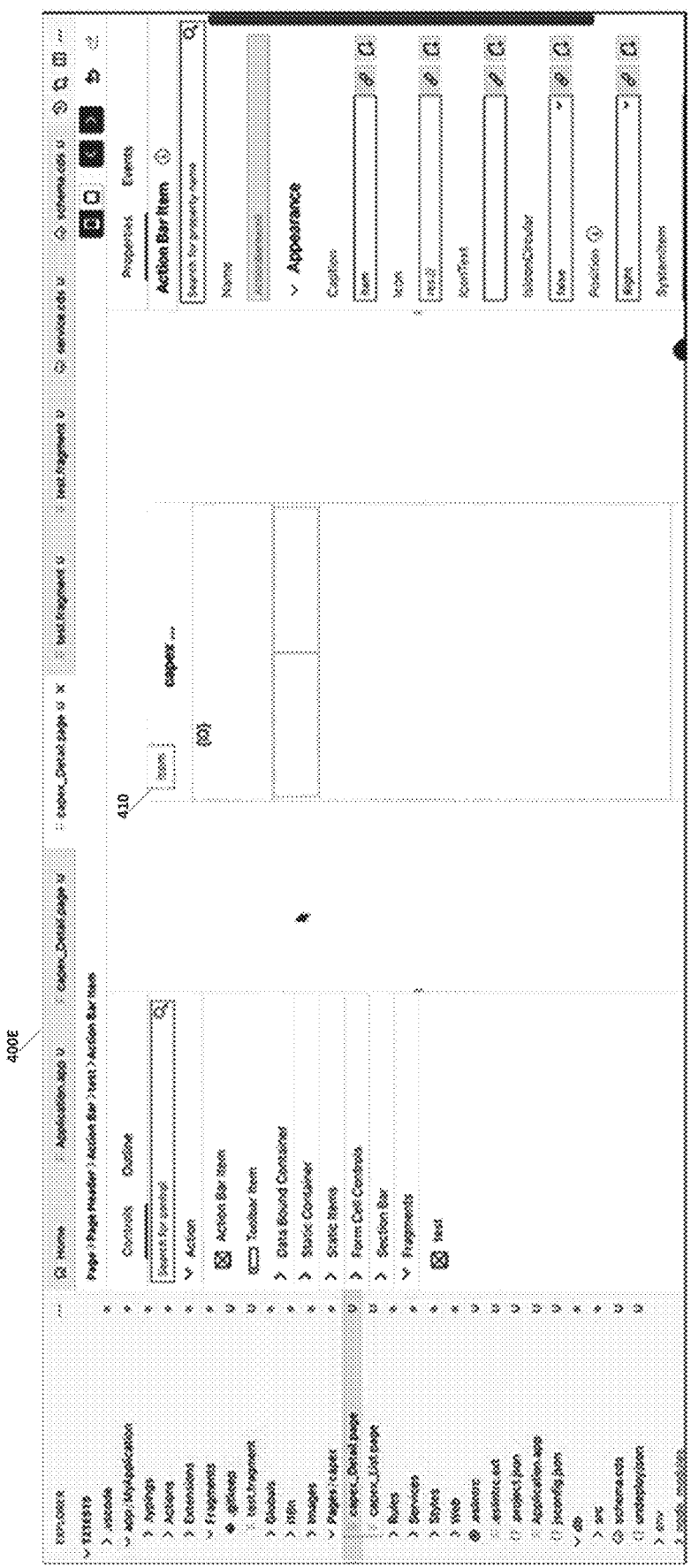

FIG. 4A depicts another example of a user interface 400A generated by the integrated development environment 150 via a client device 102A, for example. The user interface 400A may enable creation and consumption of the reusable UI metadata definitions. In the example of FIG. 4A, selection at 402 of fragments provides a list of available fragments for the reusable UI metadata definitions. Here, the application or UI being developed is a service 404 which accesses a data model 406A-B. FIG. 4B is similar to FIG. 4A but depicts user interface 400B where one of the UI objects 410 (which in this example is an action tool bar) is being dragged and placed into a the UI being developed at panel 204. FIG. 4C depicts user interface 400C which shows the properties at panel 206 after the action bar item 410 is placed at panel 204. FIG. 4D depicts the reusable UI metadata definition 415 that is mapped to the action bar item 410 selected at FIGS. 4B and C. FIG. 4E depicts user interface 400E which shows a page rendering of the UI being developed using the reusable UI metadata definition.

Figure 5:
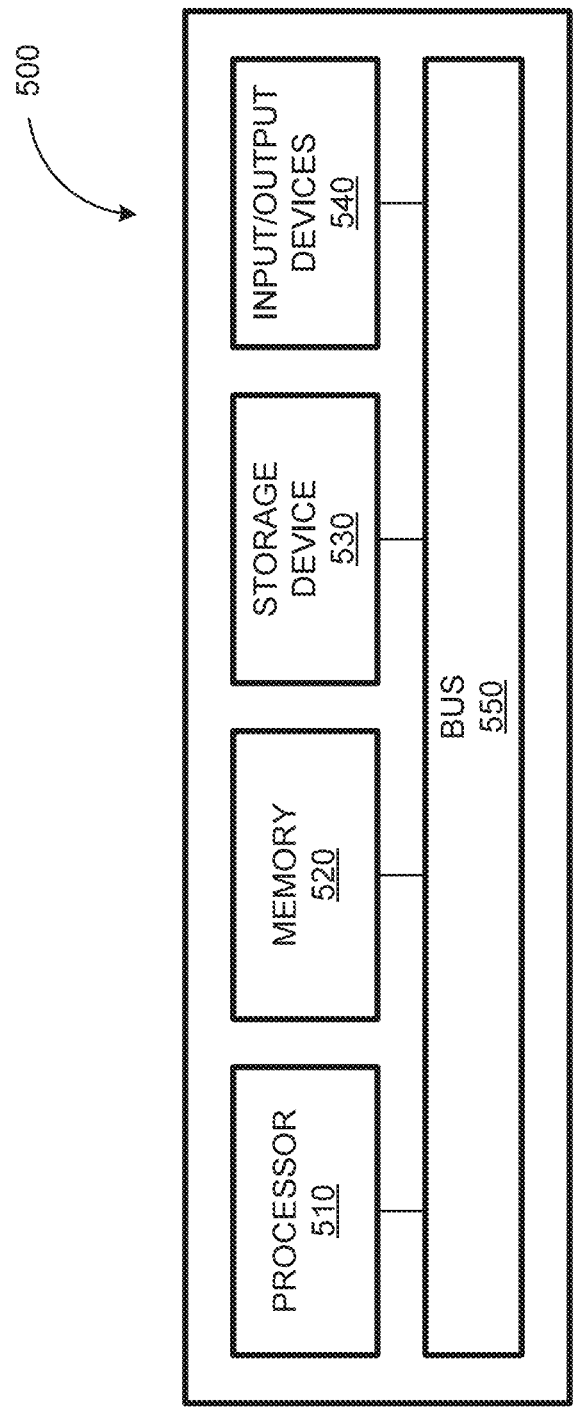
FIG. 5 depicts a block diagram illustrating an example of a computing system, in accordance with some example embodiments.

FIG. 5 depicts a block diagram illustrating an example of a computing system 500 consistent with implementations of the current subject matter. Referring to FIGS. 1-4, the computing system 500 may implement the client devices, the integrated development environment 150, system 100, and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the integrated development environment 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on,"

above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system comprising: at least one data processor; and at least one memory storing instructions which, when executed by the at least one data processor, cause operations comprising: creating at least one reusable user interface metadata definition for at least one user interface object; storing the at least one reusable user interface metadata definition; creating at least a portion of a user interface page, which includes the at least one user interface object, using the at least one reusable user interface metadata definition; overriding the at least one reusable user interface metadata definition; bundling into a container the least one reusable user interface metadata definition with other metadata definitions; and deploying the container of the at least one reusable user interface metadata definition and the other metadata definitions to a device where a metadata interpreter can generate at least one user interface object associated with the at least one reusable metadata definition.

Example 2: The system of Example 1, wherein the at least one reusable user interface metadata definition defines one or more properties associated with the at least one user interface object, and wherein the at least one reusable user interface metadata definition is flagged with a fragment extension to indicate that the at least one reusable user interface metadata definition can be overridden.

Example 3: The system of any of Examples 1-2, wherein the at least one user interface object comprises a user interface element, a search bar user interface element, a drop down user interface element, a user interface selection element, a toolbar user interface element, and/or an action bar user interface element.

Example 4: The system of any of Examples 1-3, wherein the creating at least the portion of the user interface page further comprises accessing a visual user interface editor to select the at least one user interface object and viewing, via the visual user interface editor, the at least one reusable user interface metadata definition.

Example 5: The system of any of Examples 1-4, wherein the overriding the at least one reusable user interface metadata definition further comprises editing, via the visual user interface editor, at least one property of the at least one reusable user interface metadata definition.

Example 6: The system of any of Examples 1-5, wherein the overriding the at least one reusable user interface metadata definition further comprises adding at least one property of the at least one reusable user interface metadata definition.

Example 7: The system of any of Examples 1-6, wherein the overriding the at least one reusable user interface metadata definition further comprises deleting at least one property of the at least one reusable user interface metadata definition.

Example 8: The system of any of Examples 1-7, wherein an integrated development environment bundles into the container the least one reusable user interface metadata definition with other metadata definitions.

Example 9: The system of any of Examples 1-8, wherein the deploying the container further comprises: sending the container to the device.

Example 10: A method comprising: creating at least one reusable user interface metadata definition for at least one user interface object; storing the at least one reusable user interface metadata definition; creating at least a portion of a user interface page, which includes the at least one user interface object, using the at least one reusable user interface metadata definition; overriding the at least one reusable user interface metadata definition; bundling into a container the least one reusable user interface metadata definition with other metadata definitions; and deploying the container of the at least one reusable user interface metadata definition and the other metadata definitions to a device where a metadata interpreter can generate at least one user interface object associated with the at least one reusable metadata definition.

Example 11: The method of Example 10, wherein the at least one reusable user interface metadata definition defines one or more properties associated with the at least one user interface object, and wherein the at least one reusable user interface metadata definition is flagged with a fragment extension to indicate that the at least one reusable user interface metadata definition can be overridden.

Example 12: The method of any of Examples 10-11, wherein the at least one user interface object comprises a user interface element, a search bar user interface element, a drop down user interface element, a user interface selection element, a toolbar user interface element, and/or an action bar user interface element.

Example 13: The method of any of Examples 10-12, wherein the creating at least the portion of the user interface page further comprises accessing a visual user interface editor to select the at least one user interface object and viewing, via the visual user interface editor, the at least one reusable user interface metadata definition.

Example 14: The method of any of Examples 10-13, wherein the overriding the at least one reusable user interface metadata definition further comprises editing, via the visual user interface editor, at least one property of the at least one reusable user interface metadata definition.

Example 15: The method of any of Examples 10-14, wherein the overriding the at least one reusable user interface metadata definition further comprises adding at least one property of the at least one reusable user interface metadata definition.

Example 16: The method of any of Examples 10-15, wherein the overriding the at least one reusable user interface metadata definition further comprises deleting at least one property of the at least one reusable user interface metadata definition.

Example 17: The method of any of Examples 10-16, wherein an integrated development environment bundles into the container the least one reusable user interface metadata definition with other metadata definitions.

Example 18: The method of any of Examples 10-17, wherein the deploying the container further comprises: sending the container to the device.

Example 19: A non-transitory computer-readable storage medium including instructions which, when executed by at least one data processor, cause operations comprising: creating at least one reusable user interface metadata definition for at least one user interface object; storing the at least one reusable user interface metadata definition; creating at least a portion of a user interface page, which includes the at least one user interface object, using the at least one reusable user interface metadata definition; overriding the at least one reusable user interface metadata definition; bundling into a container the least one reusable user interface metadata definition with other metadata definitions; and deploying the container of the at least one reusable user interface metadata definition and the other metadata definitions to a device where a metadata interpreter can generate at least one user interface object associated with the at least one reusable metadata definition.

Example 20: The non-transitory computer-readable storage medium of Example 19, wherein the at least one reusable user interface metadata definition defines one or more properties associated with the at least one user interface object, and wherein the at least one reusable user interface metadata definition is flagged with a fragment extension to indicate that the at least one reusable user interface metadata definition can be overridden.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
   at least one data processor; and
   at least one memory storing instructions which, when executed by the at least one data processor, cause operations comprising:
   creating at least one reusable user interface metadata definition for at least one user interface object;
   storing the at least one reusable user interface metadata definition;
   creating at least a portion of a user interface page, which includes the at least one user interface object, using the at least one reusable user interface metadata definition;
   overriding the at least one reusable user interface metadata definition;
   bundling into a container the least one reusable user interface metadata definition with other metadata definitions; and
   deploying the container of the at least one reusable user interface metadata definition and the other metadata definitions to a device where a metadata interpreter can generate at least one user interface object associated with the at least one reusable metadata definition.

2. The system of claim 1, wherein the at least one reusable user interface metadata definition defines one or more properties associated with the at least one user interface object, and wherein the at least one reusable user interface metadata definition is flagged with a fragment extension to indicate that the at least one reusable user interface metadata definition can be overridden.

3. The system of claim 1, wherein the at least one user interface object comprises a user interface element, a search bar user interface element, a drop down user interface element, a user interface selection element, a toolbar user interface element, and/or an action bar user interface element.

4. The system of claim 1, wherein the creating at least the portion of the user interface page further comprises accessing a visual user interface editor to select the at least one user interface object and viewing, via the visual user interface editor, the at least one reusable user interface metadata definition.

5. The system of claim 1, wherein the overriding the at least one reusable user interface metadata definition further comprises editing, via the visual user interface editor, at least one property of the at least one reusable user interface metadata definition.

6. The system of claim 1, wherein the overriding the at least one reusable user interface metadata definition further comprises adding at least one property of the at least one reusable user interface metadata definition.

7. The system of claim 1, wherein the overriding the at least one reusable user interface metadata definition further comprises deleting at least one property of the at least one reusable user interface metadata definition.

8. The system of claim 1, wherein an integrated development environment bundles into the container the least one reusable user interface metadata definition with other metadata definitions.

9. The system of claim 8, wherein the deploying the container further comprises:
   sending the container to the device.

10. A method comprising:
    creating at least one reusable user interface metadata definition for at least one user interface object;
    storing the at least one reusable user interface metadata definition;
    creating at least a portion of a user interface page, which includes the at least one user interface object, using the at least one reusable user interface metadata definition;
    overriding the at least one reusable user interface metadata definition;
    bundling into a container the least one reusable user interface metadata definition with other metadata definitions; and
    deploying the container of the at least one reusable user interface metadata definition and the other metadata definitions to a device where a metadata interpreter can generate at least one user interface object associated with the at least one reusable metadata definition.

11. The method of claim 10, wherein the at least one reusable user interface metadata definition defines one or more properties associated with the at least one user interface object, and wherein the at least one reusable user interface metadata definition is flagged with a fragment extension to indicate that the at least one reusable user interface metadata definition can be overridden.

12. The method of claim 10, wherein the at least one user interface object comprises a user interface element, a search bar user interface element, a drop down user interface element, a user interface selection element, a toolbar user interface element, and/or an action bar user interface element.

13. The method of claim 10, wherein the creating at least the portion of the user interface page further comprises accessing a visual user interface editor to select the at least one user interface object and viewing, via the visual user interface editor, the at least one reusable user interface metadata definition.

14. The method of claim 10, wherein the overriding the at least one reusable user interface metadata definition further comprises editing, via the visual user interface editor, at least one property of the at least one reusable user interface metadata definition.

15. The method of claim 10, wherein the overriding the at least one reusable user interface metadata definition further comprises adding at least one property of the at least one reusable user interface metadata definition.

16. The method of claim 10, wherein the overriding the at least one reusable user interface metadata definition further comprises deleting at least one property of the at least one reusable user interface metadata definition.

17. The method of claim 10, wherein an integrated development environment bundles into the container the least one reusable user interface metadata definition with other metadata definitions.

18. The method of claim 10, wherein the deploying the container further comprises:

sending the container to the device.

19. A non-transitory computer-readable storage medium including instructions which, when executed by at least one data processor, cause operations comprising:

creating at least one reusable user interface metadata definition for at least one user interface object;

storing the at least one reusable user interface metadata definition;

creating at least a portion of a user interface page, which includes the at least one user interface object, using the at least one reusable user interface metadata definition;

overriding the at least one reusable user interface metadata definition;

bundling into a container the least one reusable user interface metadata definition with other metadata definitions; and deploying the container of the at least one reusable user interface metadata definition and the other metadata definitions to a device where a metadata interpreter can generate at least one user interface object associated with the at least one reusable metadata definition.

20. The non-transitory computer-readable storage medium of claim 19, wherein the at least one reusable user interface metadata definition defines one or more properties associated with the at least one user interface object, and wherein the at least one reusable user interface metadata definition is flagged with a fragment extension to indicate that the at least one reusable user interface metadata definition can be overridden.

\* \* \* \* \*